United States Patent
Udell et al.

(10) Patent No.: US 7,646,668 B2
(45) Date of Patent: Jan. 12, 2010

(54) MAINTAINING DYNAMIC COUNT OF FIFO CONTENTS IN MULTIPLE CLOCK DOMAINS

(75) Inventors: John Udell, Colorado Springs, CO (US); Richard Solomon, Colorado Springs, CO (US); Eugene Saghi, Colorado Springs, CO (US); Jeffrey K. Whitt, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 91 days.

(21) Appl. No.: 12/058,964

(22) Filed: Mar. 31, 2008

(65) Prior Publication Data
US 2009/0244993 A1 Oct. 1, 2009

(51) Int. Cl.
*G11C 8/00* (2006.01)
(52) U.S. Cl. .................. 365/236; 365/193; 365/233.1
(58) Field of Classification Search ........... 365/236, 365/193, 233.1
See application file for complete search history.

(56) References Cited

U.S. PATENT DOCUMENTS 6,577,555 B2 * 6/2003 Roohparvar ............... 365/236
6,910,096 B2 * 6/2005 Hashimoto et al. .......... 365/193

* cited by examiner

*Primary Examiner*—Huan Hoang
(74) *Attorney, Agent, or Firm*—William W. Cochran; Cochran Freund & Young LLC

(57) ABSTRACT

Disclosed is a system that generates a write count value for indicating whether data can be read from a FIFO and a system that generates a read count value for indicating whether data can be written to a FIFO. Each of these systems operates in two separate clock domains. In the system that generates a write count value, write strobes are stored in parallel in a register in a first clock domain. The plurality of synchronizers trigger on a rising edge of the write strobe that is stored in the parallel register and generate an increment pulse in a second clock domain. An up/down counter reads the increment pulse in parallel and increments the up/down counter in parallel. A decrement signal from a read strobe decrements the up/down counter. The output of the counter is fed to a register that provides a write counter value to handshake logic that indicates whether data can be read from a FIFO without underflowing the FIFO.

10 Claims, 3 Drawing Sheets

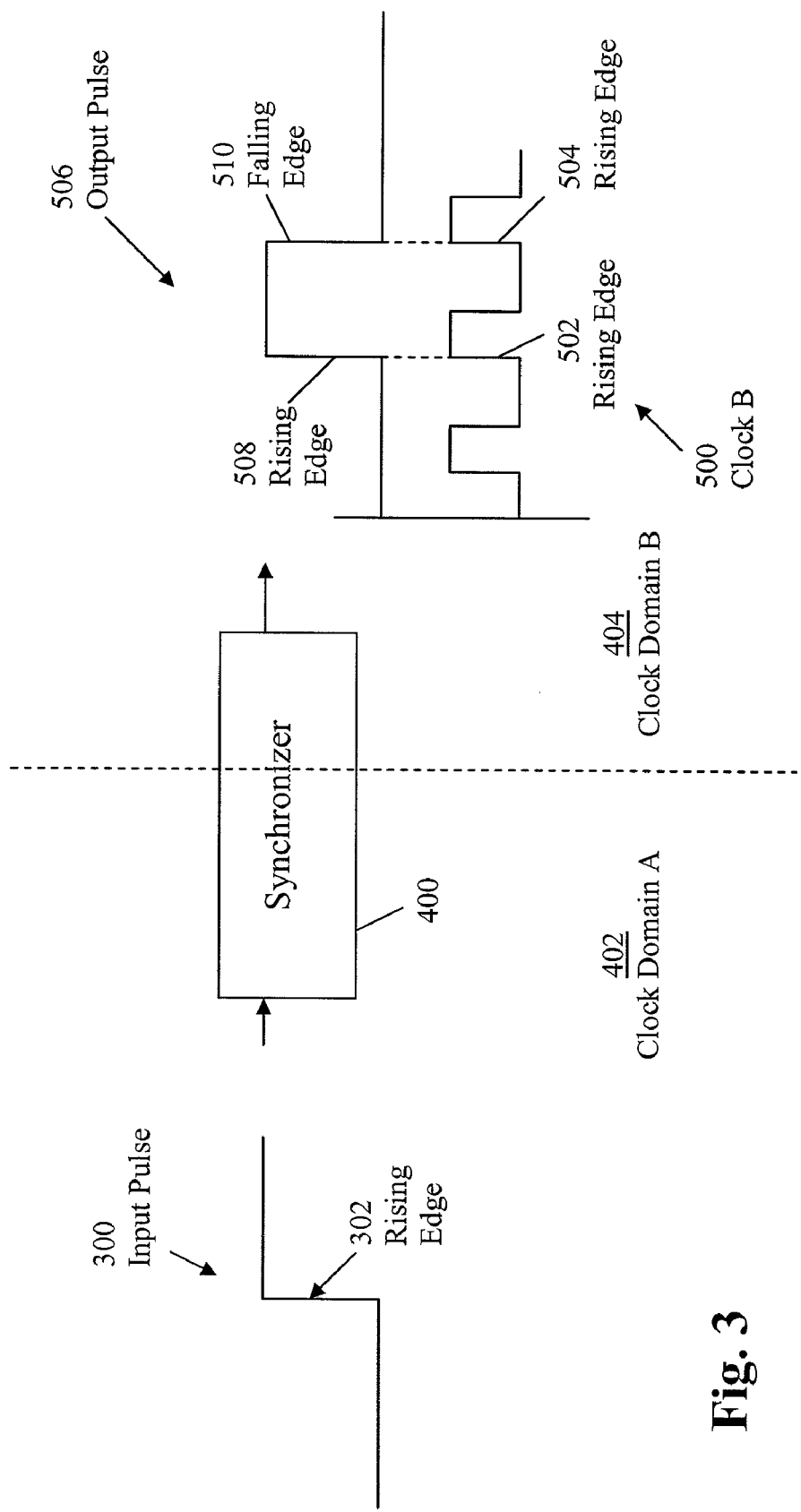

US 7,646,668 B2

MAINTAINING DYNAMIC COUNT OF FIFO CONTENTS IN MULTIPLE CLOCK DOMAINS

BACKGROUND OF THE INVENTION

Typically, silicon devices operate in response to a clock signal. Clock signals are used to transfer data and otherwise provide timing signals for operation of processing devices.

It may be necessary to use more than one clock signal on a chip, since various tasks performed by the chip may require different clock rates. These different clock rates are referred to as clock domains. Difficulties may be encountered in the transfer of data from one clock domain to another clock domain on a chip.

Latency in data transfers is the delay that is created in transferring data through a system. Latency can adversely affect data processing in computer systems by delaying the transfer of data and creating problems associated with reading and writing of data. It is therefore advantageous to eliminate latency, wherever possible, to increase the speed at which systems operate and minimize other problems associated with latency.

The process of transferring data from one clock domain to another clock domain in a FIFO may add a significant amount of latency to the overall transfer. This latency is the result of the processes that are necessary to ensure that the FIFO is not overflowed or underflowed during the transfer process.

SUMMARY OF THE INVENTION

One embodiment of the present invention may therefore comprise a method of generating a write count value in a read clock domain from write strobes generated in a write clock domain indicating an amount of data that is present in a FIFO comprising: writing the write strobes to sequential storage devices in a parallel register in response to a write clock signal and simultaneously clearing other devices in the parallel register; transferring data stored in the sequential storage devices to synchronizers in response to the write clock signal; detecting a leading edge of the data transferred from the sequential storage devices; generating an increment pulse in the synchronizers in the read clock domain; applying the increment pulses to an up/down counter in parallel to increment the up/down counter; decrementing the up/down counter upon receipt of a read strobe pulse; generating a write counter value in the read clock domain that is indicative of the amount of data that is present in the FIFO.

An embodiment of the present invention may further comprise a method of generating a read count value in a write clock domain from read strobes generated in a read clock domain indicating a number of open slots present in a FIFO comprising: writing the read strobes to sequential storage devices in a parallel register in response to a read clock signal and simultaneously clearing other devices in the parallel register; transferring data stored in the sequential storage devices to synchronizers in response to the read clock signal; detecting a leading edge of the data transferred from the sequential storage devices; generating a decrement pulse in the synchronizers in the write clock domain; applying the decrement pulses to an up/down counter in parallel to decrement the up/down counter; incrementing the up/down counter upon receipt of a write strobe pulse; generating a read counter value in the read clock domain that is indicative of the number of open slots that are present in the FIFO.

An embodiment of the present invention may farther comprise a device for generating a write counter value in a read clock domain to indicate the amount of data that is present in a FIFO comprising: steering/reset logic that generates a write output pulse in the write clock domain on sequential outputs and simultaneously generates a reset pulse on other outputs; a parallel register that stores the write output pulse and generates a rising edge signal in the write clock domain; synchronizers connected in parallel to the parallel register that detect the rising edge signal and generate increment pulses in the read clock domain; an up/down counter that receives the increment pulses in parallel and increments the up/down counter in response to the increment pulses, and receives a read strobe pulse and decrements the up/down counter in response to the read strobe pulse, the up/down counter having a counter output that provides a write count signal; a register that generates a write counter value in the read clock domain that indicates the amount of data that is present in the FIFO.

An embodiment of the present invention may further comprise a device for generating a read counter value in a write clock domain from read strobes generated in a read clock domain to indicate the number of slots open in a FIFO comprising: steering/reset logic that generates a read output pulse in the read clock domain on sequential outputs and simultaneously generates a reset pulse on other outputs; a parallel register that stores the read output pulse and generates a rising edge signal in the read clock domain; synchronizers connected in parallel to the parallel register that detect the rising edge signal and generate decrement pulses in the write clock domain; an up/down counter that receives the decrement pulses in parallel and decrements the up/down counter in response to the decrement pulses, and receives a read strobe pulse and increments the up/down counter in response to the write strobe pulse, the up/down counter having a counter output that provides a read count signal; a register that generates a read counter value in the write clock domain that indicates the amount of data that is present in the FIFO.

BRIEF DESCRIPTION OF THE DRAWINGS

FIG. 3 is graph of an input pulse.

FIG. 4 is a block diagram of a synchronizer.

FIG. 5 is a graph of an output pulse and a clock pulse.

DETAILED DESCRIPTION OF THE EMBODIMENTS

The process of writing data to a FIFO register in a first clock domain and reading data from the same FIFO register in another clock domain requires careful timing of the transfer of data to prevent overflowing and underflowing of the FIFO during the transfer process. One method that has been used to prevent overflowing and underflowing of the FIFO is to synchronize the read and write signals that are applied to the FIFO in the two domains. In accordance with this process, the read signal is synchronized to the write signal clock domain so that a write signal is only applied to the FIFO when a slot in the FIFO has been emptied. Also, the write signal must be synchronized into the read clock domain, so that the read logic will only read data when there is data in the FIFO. Another technique that is used to prevent overflowing or underflowing of the FIFO is the use of independent counters in both the write domain and the read domain. The read and write counters are then compared in both clock domains. In the write clock domain, the comparison determines when the FIFO is full and prevents data overflow. In the read clock domain, the comparison determines when the FIFO is empty and prevents data underflow.

The process of synchronizing signals between clock domains has various disadvantages. For example, it is possible for a single source-clockwide signal to be interpreted as multiple signals, since a source clockwide signal can potentially be sampled multiple times in a destination clock domain. Also, if the source clock is running faster than the destination clock, a single source clockwide pulse may be missed entirely in the destination clock domain. Further, a single source clockwide pulse can be sampled twice by the destination clock, as a result of clock jitter, when the source and destination clock frequencies are very close. Also, when data bits are being written to a data bus, bits may be sampled from multiple flip-flops on the same clock pulse. Routing delays in silicon and clock delays may result in improper data being applied to the bus during the proper clock cycle.

These problems have been eliminated by requiring handshaking logic to be used between different clock domains. In other words, for single bit synchronization, an acknowledge signal will be generated in the destination clock domain when the synchronized signal is detected. The source clock will not try to synchronize another signal until this acknowledge signal is received. In this fashion, multiple signals in a faster source clock domain are transformed into discreet, easily identifiable signals in the destination clock domain. However, this process introduces latency. The delay in the transmission and receipt of acknowledge signals from the destination logic, or a valid signal from the source logic, adds several clock cycles of delay for every access of the FIFO data. This seriously impacts data throughput of the FIFO.

Figure 1:
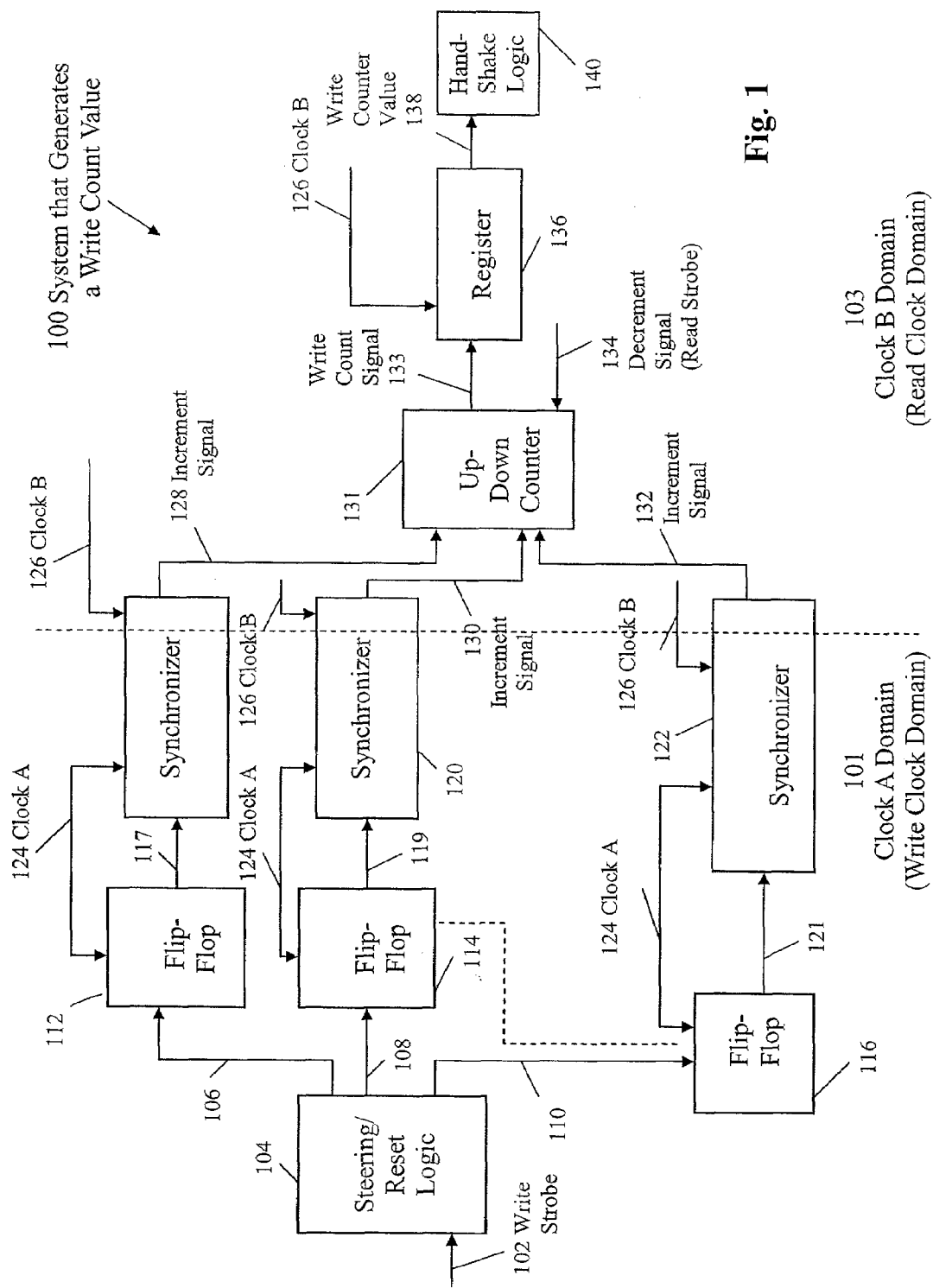
FIG. 1 is a schematic block diagram of one embodiment of the invention.

FIG. 1 is a schematic block diagram of one embodiment of a device for generating a write counter value indicative of the amount of data that has been written to a FIFO (not shown) to ensure that data is available in the FIFO to read during a read operation. The embodiment of FIG. 1 counts write operations during a write process to a storage device. As shown in FIG. 1, a write strobe 102 is applied to steering/logic circuitry 104, which generates a sequenced output between outputs 106, 108, 110. When one of the flip-flops 112, 114, 116 is set from a signal generated by steering/reset logic 104, the other flip-flops are cleared. In this manner, only one flip-flop is high at any one time. For example, when a write strobe signal 102 is received by the steering/reset logic 104, a pulse may be generated on output 106 that sets flip-flop 112. Simultaneously, signals are generated on outputs 108, 110 that reset flip-flops 114, 116, respectively, to zero. When another write strobe signal 102 is received by the steering/reset logic 104, flip-flop 110 may be set high and flip-flops 112, 116 are reset to zero.

Hence, the steering/reset logic 104 steers the write strobe pulses 102 to a plurality of different flip-flops that store and hold the write strobes in parallel, so that a plurality of sequential write strobe signals 102 are stored in parallel in flip-flops 112, 114, 116, in clock A domain 101. This process ensures that each write strobe signal will be stored in a register and applied to a synchronizer. The setting of the flip-flops and the pulses generated by the steering/reset logic 104 all occur in clock domain A 101, which is on the left side of the dotted line illustrated in FIG. 1. Clock 124 is applied to flip-flops 112, 114, 116 and is also applied to the input of synchronizers 118, 120, 122. As will be more fully explained below, the number of flip-flops utilized should be equal to or greater than the number of clock A pulses 124 that are required to clock the write strobe 102 through the device illustrated in FIG. 1 to the up/down counter 131.

As shown in FIG. 1, synchronizers 118, 120, 122 receive the outputs 117, 119, 121 of flip-flops 112, 114, 116, respectively. The synchronizers 118, 120, 122 detect the rising edge of the outputs 117, 119, 121 of flip-flops 112, 114, 116. Upon detection of the rising edge of a pulse at the input of the synchronizer, the synchronizer then generates a clock pulse in the clock B domain 103. This is more fully illustrated in FIGS. 3, 4 and 5.

Referring to FIG. 3, an input pulse 300 from the output of a flip-flop has a rising edge 302. Pulse 300 is applied to the input of synchronizer 400 in the clock domain A 402. The synchronizer 400 detects the rising edge 302 and generates an output pulse 506 illustrated in FIG. 5, in the clock domain B 404. As shown in FIG. 5, when the synchronizer 400 detects the rising edge 302 of the input pulse 300, it causes a rising edge 508 of an output pulse 506 to be generated from the rising edge 502 of the clock B 500 in the clock B domain 404. A falling edge 510 of the output pulse 506 is generated on the next rising edge 504 of the clock B signal 500 in the clock B domain 404. Hence, synchronizer 400 has an edge detector in the front end that detects the rising edge 302 of an input pulse from a flip-flop and generates a single output pulse 506 on its output that is a pulse in the clock B domain 404. Referring again to FIG. 1, clock B 126 is applied to each of the synchronizers 118, 120, 122. Clock B 126 corresponds to the clock B 500 illustrated in FIG. 5.

Figure 2:
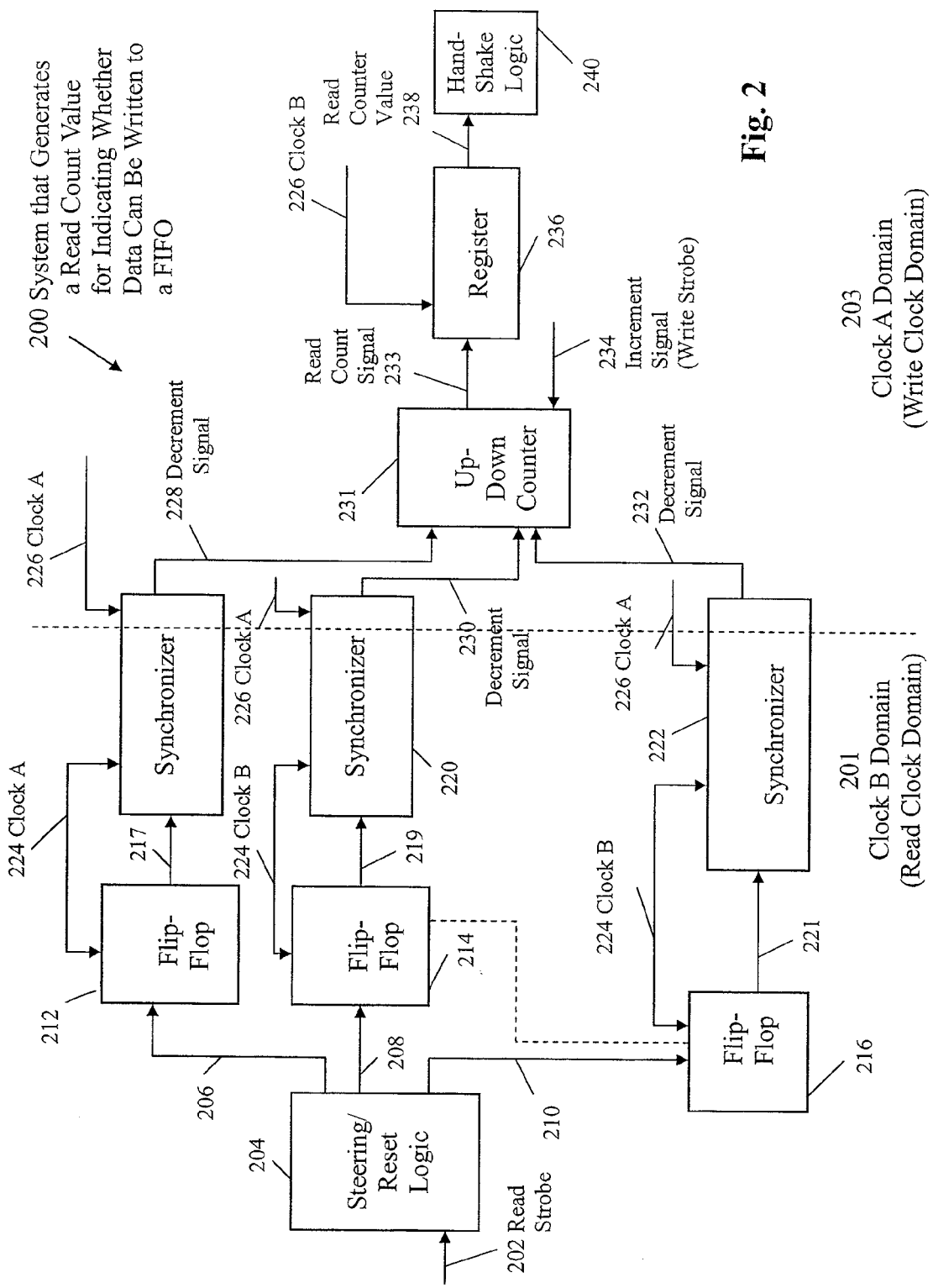
FIG. 2 is a diagram illustrating the functionality of a synchronizer.

As also illustrated in FIG. 1, the output pulses of the synchronizers 118, 120, 122 are shown as increment signals 128, 130, 132. These increment signals 128, 130, 132 are applied in parallel to the up/down counter 131. The up/down counter is capable of reading the increment signals 128, 130, 132 in parallel and incrementing the up/down counter as the increment signals are applied to the up/down counter 131. The parallel increment signals 128, 130, 132 and the parallel up/down counter 131 allow two strobes to be sent to the clock B domain 103 in the same clock cycle. Due to the nature of the timing inherent in synchronizing a signal between two clock domains, two signals can be presented to the clock B domain in the same clock cycle. The parallel up/down counter 131 allows multiple signals during the same clock pulse to be loaded at the same time. The same is true for signals crossing from the clock B domain 201, i.e., document signals 228, 230, 232, to the clock A domain 203, as shown in FIG. 2. A read strobe signal 134 is also applied to the up/down counter 131, which decrements the count in the up/down counter 131. The decrement signal 134 is applied to the up/down counter 131 without any latency built into the system, so that the up/down counter 131 immediately reflects the reading of a data bit from the FIFO. The output 133 of the up/down counter 131 is applied to a register 136, that stores the count in the up/down register 131. This write counter value 138, that is stored in the register 136, is applied to a handshake logic 140, which indicates whether or not there is data in the FIFO that can be read from the FIFO. Handshaking logic 140 interfaces with a bus protocol to indicate that the read hardware that reads data from the FIFO can read data whenever the write counter value 138 is positive and indicates that there is data to be read from the FIFO. Hence, when the write counter value 138 is positive, the handshake logic 140 signals the system that reads data from the FIFO to generate a read strobe.

FIG. 2 is a schematic block diagram of a system that generates a read counter value 238 indicating that there are slots open in a FIFO device (not shown), so that data can be written to the FIFO. As shown in FIG. 2, a read strobe 202 that is applied to the FIFO to read data is also applied to the steering/reset logic 204. The steering/reset logic 204 operates in the same fashion as steering/reset logic 104, to distribute the series of incoming read strobes to the various flip-flops 212, 214, 216 via connectors 206, 208, 210, respectively. Each time a new read strobe 202 is detected, the signal is latched into one of the flip-flops 212, 214, 216 in the clock B domain 201. Steering logic determines the flip-flop to which the read strobe 202 is applied. Since the remaining flip-flops are cleared, the next read strobe 202 will generate a rising edge on only one of the flip-flops 212, 214, 216. The output of the flip-flops 212, 214, 216 is applied to the input of the synchronizers 218, 220, 222 via connectors 217, 219, 221. Synchronizers 218, 220, 222 detect the rising edge of the output of the flip-flops 212, 214, 216 and generate a single output pulse in the A clock domain 203. Clock B 224 is applied to the flip-flops 212, 214, 216 and the input of the synchronizers 218, 220, 222. Clock A 226 is applied to the output of synchronizers 218, 220, 222, which is used by the synchronizers 218, 220, 222 to generate the decrement signals 228, 230, 232, respectively, in the clock A domain 203, and that correspond to output pulse 506, illustrated in FIG. 5. The up/down counter 231 reads the decrement signals 228, 230, 232 in parallel and decrements the up/down counter 231 in accordance with all of these signals. An increment signal 234 is applied to the up/down counter 231 each time a write strobe signal is applied to the FIFO indicating that additional data is being stored in the FIFO. There is no latency associated with the increment signal 234, so an accurate and timely increment of the up/down counter 231 is achieved with the increment signal 234. The up/down counter 231 applies the count to a register 236, which stores the count value in register 236. Register 236 is clocked by clock B 226 to generate a read counter value output 238, which is applied to handshake logic 240. The read counter value 238 indicates whether one or more slots are open in the FIFO, so that data can be written to the FIFO. Handshake logic 240 interfaces with a bus protocol to indicate to the write hardware that writes data to the FIFO, can write data whenever the read counter value 238 indicates that slots are available for writing data into the FIFO.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of generating a write count value in a read clock domain from write strobes generated in a write clock domain indicating an amount of data that is present in a FIFO comprising:

writing said write strobes to sequential storage devices in a parallel register in response to a write clock signal and simultaneously clearing other devices in said parallel register;

transferring data stored in said sequential storage devices to synchronizers in response to said write clock signal;

detecting a leading edge of said data transferred from said sequential storage devices;

generating an increment pulse in said synchronizers in said read clock domain;

applying said increment pulse to an up/down counter in parallel to increment said up/down counter;

decrementing said up/down counter upon receipt of a read strobe pulse;

generating a write counter value in said read clock domain that is indicative of said amount of data that is present in said FIFO.

2. The method of claim 1 wherein said process of writing said write strobes to sequential storage devices in a parallel register comprises sequentially writing said write strobes to a plurality of flip-flops by directing said write strobes through steering logic.

3. The method of claim 2 further comprising:

selecting a number of said flip-flops that form said parallel register as greater than or equal to a number of said write clock pulses that occur from the time when said write strobe is first received until said up/down counter is incremented by said write strobe.

4. A method of generating a read count value in a write clock domain from read strobes generated in a read clock domain indicating a number of open slots present in a FIFO comprising:

writing said read strobes to sequential storage devices in a parallel register in response to a read clock signal and simultaneously clearing other devices in said parallel register;

transferring data stored in said sequential storage devices to synchronizers in response to said read clock signal;

detecting a leading edge of said data transferred from said sequential storage devices;

generating a decrement pulse in said synchronizers in said write clock domain;

applying said decrement pulse to an up/down counter in parallel to decrement said up/down counter;

incrementing said up/down counter upon receipt of a write strobe pulse;

generating a read counter value in said read clock domain that is indicative of said number of open slots that are present in said FIFO.

5. The method of claim 4 wherein said process of writing said read strobes to sequential storage devices in parallel register comprises sequential writing said read strobes to a plurality of flip-flops by directing said read strobes through steering logic.

6. The method of claim 5 further comprising:

selecting said flip-flops that form said parallel register as an amount greater than or equal to a number of said read clock pulses that occur from the time when said read strobe is first received until said up/down counter is decremented by said read strobe.

7. A device for generating a write counter value in a read clock domain to indicate the amount of data that is present in a FIFO comprising:

steering/reset logic that generates a write output pulse in a write clock domain on sequential outputs and simultaneously generates a reset pulse on other outputs;

a parallel register that stores said write output pulse and generates a edge signal in said write clock domain;

synchronizers connected in parallel to said parallel register that detect said rising edge signal and generate increment pulses in said read clock domain;

an up/down counter that receives said increment pulses in parallel and increments said up/down counter in response to said increment pulses, and receives a read strobe pulse and decrements said up/down counter in response to said read strobe pulse, said up/down counter having a counter output that provides a write count signal;

a register that generates a write counter value in said read clock domain that indicates the amount of data that is present in said FIFO.

8. The device of claim 7 wherein said parallel register comprises a predetermined number of flip-flops that are connected in parallel to said steering/reset logic, said predetermined number being greater than or equal to the number of clock pulses in said write clock domain that are required to clock a write pulse from said steering/reset logic to said up/down counter.

9. A device for generating a read counter value in a write clock domain from read strobes generated in a read clock domain to indicate the number of slots open in a FIFO comprising:

steering/reset logic that generates a read output pulse in said read clock domain on sequential outputs and simultaneously generates a reset pulse on other outputs;

a parallel register that stores said read output pulse and generates a rising edge signal in said read clock domain;

synchronizers connected in parallel to said parallel register that detect said rising edge signal and generate decrement pulses in said write clock domain;

an up/down counter that receives said decrement pulses in parallel and decrements said up/down counter in response to said decrement pulses, and receives a read strobe pulse and increments said up/down counter in response to said read strobe pulse, said up/down counter having a counter output that provides a read count signal;

a register that generates a read counter value in said write clock domain that indicates the amount of data that is present in said FIFO.

10. The device of claim 9 wherein said parallel register comprises a predetermined number of flip-flops that are connected in parallel to said steering/reset logic, said predetermined number being greater than or equal to the number of clock pulses in said read clock domain that are required to clock a read pulse from said steering/reset logic to said up/down counter.

* * * * *